United States Patent [19]

Sampsell et al.

[11] Patent Number: 5,457,566
[45] Date of Patent: Oct. 10, 1995

[54] DMD SCANNER

[75] Inventors: Jeffrey B. Sampsell, Plano; Daryl G. Sartain, Rowlett, both of Tex.

[73] Assignee: Texas Instruments Incorporated, Dallas, Tex.

[21] Appl. No.: 999,585

[22] Filed: Dec. 30, 1992

Related U.S. Application Data

[63] Continuation of Ser. No. 796,146, Nov. 22, 1991, abandoned.

[51] Int. Cl.$^6$ .................................................. G02B 26/00
[52] U.S. Cl. ........................... 359/292; 359/291; 359/295
[58] Field of Search ................................... 359/291, 292, 359/295, 297, 298, 212; 257/431, 435, 459; 358/233, 62, 474, 494; 340/764; 355/233, 217; 348/755, 770, 771

[56] References Cited

U.S. PATENT DOCUMENTS

| | | | |
|---|---|---|---|
| 3,517,126 | 6/1970 | Yamada et al. | 358/233 |
| 3,594,583 | 7/1971 | Sheldon | 359/285 |
| 3,886,310 | 5/1975 | Guldberg et al. | 359/291 |
| 4,087,810 | 5/1978 | Hung et al. | 359/291 |
| 4,229,732 | 10/1980 | Hartstein et al. | 358/233 |
| 4,596,992 | 6/1986 | Hornbeck | 359/291 |
| 4,638,309 | 1/1987 | Ott | 359/291 |
| 4,680,579 | 7/1987 | Ott | 340/783 |
| 4,682,235 | 7/1987 | Chism, Jr. | 358/212 |
| 4,728,185 | 5/1988 | Thomas | 353/122 |
| 5,018,256 | 5/1991 | Hornbeck | 359/291 |
| 5,287,215 | 2/1994 | Warde et al. | 359/298 |

FOREIGN PATENT DOCUMENTS

| | | |
|---|---|---|
| 0391529 | 2/1990 | European Pat. Off. . |
| 0437766 | 12/1990 | European Pat. Off. . |
| 2562363 | 10/1985 | France . |
| 4008394 | 9/1991 | Germany . |

OTHER PUBLICATIONS

Hornbeck, "128×128 Deformable Mirror Device", *IEEE Transactions on Electron Devices*, vol. 30, No. 5, May 1983, pp. 539–545.

Gustafsson, et al., "A silicon light modulator", *Journal of Physics E/Scientific Instruments*, vol. 21, No. 7, Jul. 1988, pp. 680–685.

*Primary Examiner*—Scott J. Sugarman
*Assistant Examiner*—Thomas Robbins
*Attorney, Agent, or Firm*—Julie L. Reed; James C. Kesterson; Richard L. Donaldson

[57] ABSTRACT

A scanning optical system is disclosed. The system consists of a spatial light modulator with minimum diffraction effects that can be scanned line by line, a detector appropriate to the application and appropriate optics. One application of such a system is in the infrared realm. The disclosure eliminates the need for a spinning mirror that is standard is infrared scanning systems. Another application is in photocopying. Using a line scanning device, such as a membrane deformable mirror device, eliminates the need for a moving light bar.

20 Claims, 1 Drawing Sheet

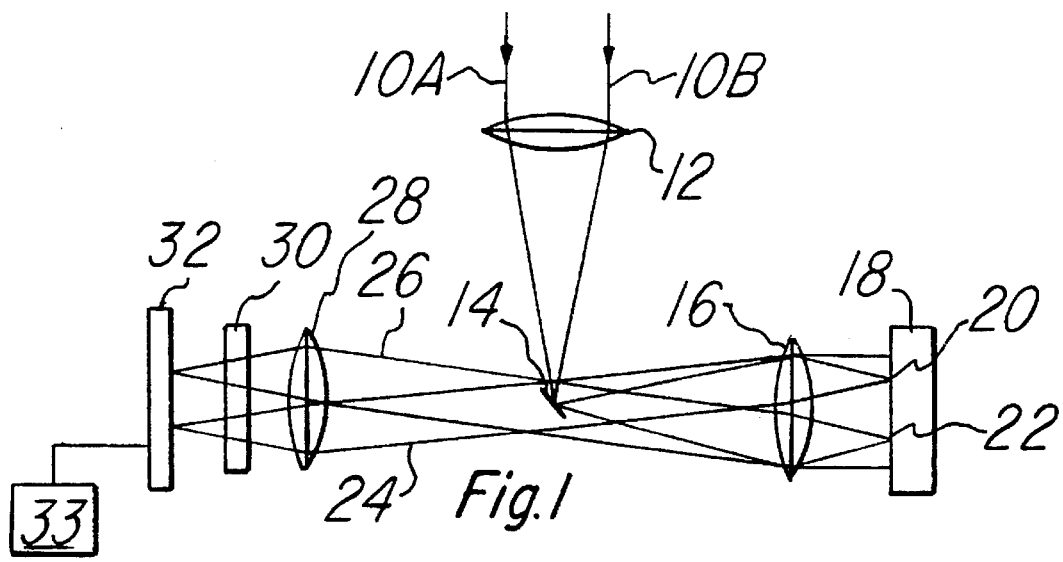
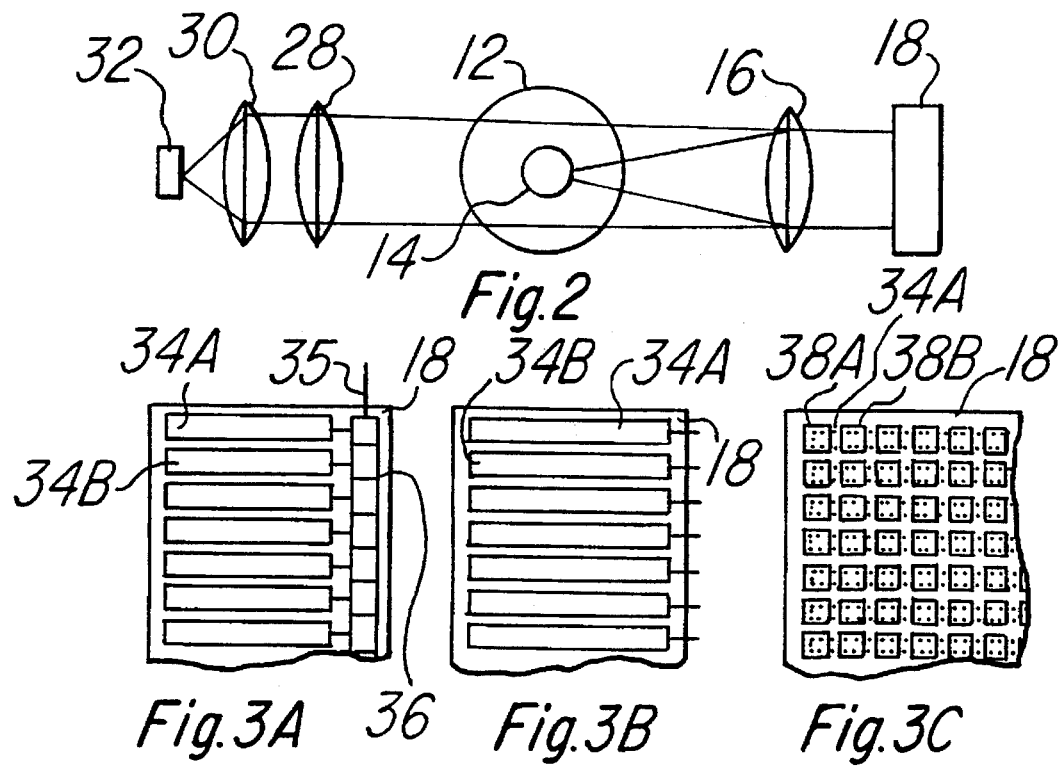

DMD SCANNER

This application is a Continuation of application Ser. No. 07/796,146 filed Nov. 22, 1991, which is now abandoned.

BACKGROUND OF THE INVENTION

1. Field of the Invention

This invention relates to scanning systems, more particularly to scanning systems that utilize spatial light modulators.

2. Background of the Invention

Scanning systems have many different applications, from photocopying to infrared imaging systems. Most scanning systems, such as forward-looking infrared (FLIR) systems, use a spinning mirror that "throws" a part of the image to a detector at any given time. The use of this mirror causes some problems, such as large size, weight, sensitivity to vibration, and power requirements. The mirror must have some type of driver, such as a motor or a coil. This results in even more volume, weight and power needs.

The spinning mirror does solve one problem. Infrared radiation has a longer wavelength than visible light. It is hard to use a small reflective surface, such as a reflective cell of a spatial light modulator array, with such a wavelength. Diffraction effects, where the light is "bounced" in all different directions, result in high interference between the cells and the detector does not receive an accurate amount of radiation that it can convert into any type of useful image. A similar problem exists in other applications, such as photocopying, where the image must be readable.

It is desirable to use spatial light modulators with such a system in place of the spinning mirror, or other scanning techniques. This would reduce the size of the package, the weight of the system, and the power requirements, and increase mechanical robustness. One candidate for a spatial light modulator might be the deformable mirror devices (DMD) that consist of individual reflective elements that can be deflected over an air gap by an electrode, that are addressed by fast CMOS circuitry. However, a preferred candidate would be the membrane DMD, which has less diffraction problems than other presently available types of DMDs. The membrane DMD is manufactured by placing a metal membrane over a spacer layer, under which lay the electrodes. As an electrode is addressed, the membrane "deforms" at the point of the membrane that was directly above the addressed electrode.

Using a membrane, which acts as a large mirror, the diffraction effects brought on by a spatial light modulators' usually small cell size would be eliminated.

SUMMARY OF THE INVENTION

Objects and advantages will be obvious, and will in part appear hereinafter and will be accomplished by the present invention which provides an image scanner, using an area array spatial light modulator (SLM), and appropriate optics to view and pass the image to a detector, such as an infrared detector or a photoreceptor. The image is scanned by activating one line at a time along the array of SLM cells to replace the function of the moving mirror in conventional scanners.

It is an object of this invention to provide a scanner that is lighter and more reliable, without any moving mechanical parts, particularly adapted for longer wavelength light such as infrared.

BRIEF DESCRIPTION OF THE DRAWINGS

For a complete understanding of the invention, and the advantages thereof, reference is now made to the following description in conjunction with the accompanying drawings, in which:

FIG. 1 shows a top view of a scanning optical system.

FIG. 2 shows a side view of scanning optical system.

FIGS. 3A and 3B show two alternatives for addressing a membrane deformable mirror device to by used in a scanning optical system.

FIG. 3C shows an alternative for addressing a membrane as an array of small membranes.

DETAILED DESCRIPTION OF THE PREFERRED EMBODIMENTS

FIG. 1 shows the top view of a scanning optical system. The image source is viewed along paths 10A and 10B through lens 12. In this embodiment, lens 12 is a circular lens, but any configuration of such a lens, such as a slabbed lens, could be used. The image light containing the image is transmitted through the lens to stationary stop mirror 14, which is oval in this embodiment for better matching to the lenses. If the large membrane is used, light will either be reflected up or down from the line that is deformed, not from side to side. A better idea for the shape of the mirror may be a long rectangular mirror, or some other shape appropriate to the shape of the deflected membrane. Mirror 14 reflects the light to lens 16, which can be selected with the same freedom as lens 12. Lens 16 transmits the light to spatial light modulator 18.

The light comes in contact with all of the spatial light modulator 18. The modulator can be of many different types. Due to the diffraction effects, especially when dealing in the infrared realm, the membrane deformable mirror device (DMD) is ideal. Any modulator that has sufficiently low diffraction combined with individual control could be used. To avoid confusion, however, the discussion will be limited to DMDs.

Membrane DMDs normally consist of CMOS addressing circuitry in a substrate, with electrodes lying underneath the membrane. The membrane can be suspended over the electrodes, apart from them, in a variety of ways. One method is to place an elastomer under the membrane, on top of the electrodes. Another is to lay down a spacer layer, deposit the membrane on top of the spacer, etching holes into the membrane and etching the spacer out from under the membrane through these holes. The monolithic manufacturing process as described above results in a unitary, multi-layered device.

As the image comes in contact with the membrane, the membrane is scanned. This can be accomplished by addressing a line of electrodes, or one long linear electrode, under the membrane. The line of the image falling on this long, deflected area or row of deflected areas is then reflected off of the membrane at an angle, which will cause that part of the image to miss the stop mirror and pass through the lens element 28, through lens 30, and impinge upon the detector 32.

One example of this would be the light rays at point 20 on the DMD. The light travels along path 24, which has substantial light that goes around the stop mirror 14. Lens 28 focuses the light on the detector. Lens 30 is an anamorphic lens that does not have any power in this direction. As will be seen later, lens 30 compresses a rectangular or square image into a line image. Detector 32 could be adapted for whatever application the designer desires. In an infrared system, this would be an infrared detector that translates the radiation into a visual image. In a photocopier this could be the input to the print engine optics 33, which will eventually configure the image on a photoreceptive drum. An additional difference is in the illumination of the image source. In an infrared system, the image source is self-radiating. In a photocopier the image source must be illuminated by a light. A similar path is shown for a deflection at point 22. In that case the light travels along path 26 to the lenses 28 and 30, and the detector 32.

FIG. 2 shows the side view of the optical system, on the side away from the image source. Lens 12 is shown from its back view, which is a circle, where the front of the lens is facing the image source. Mirror 14 is shown as a circle, since it is an oval mirror that is deflected off at an angle from the straight line. Lens 16 is a circular lens, so it has the same view from any side. Spatial light modulator 18 is configured as an area array, which is approximately a square. The lens element 30, which is a cylindrical lens, appears to be a circular lens from this aspect. As can be seen by the path of the light through lens 30, lens 30 compresses the vertical image into a line before it impinges upon detector 32.

The membrane must have some means to force it to deflect in rows sequentially travelling down the membrane. One option for this is shown in FIG. 3A. Spatial light modulator 18 is shown before the membrane is added. Shift register 36 receives data along line 35. The simplest way to accomplish the addressing is to place all zeros in the shift register. When scanning is to start, a one is shifted into the topmost shift register cell. This will cause the electrode 34A to be activated, which in turn will cause the membrane to deflect across its width at that point. The next shift will put a zero back into the shift register cell corresponding to the electrode 34A, and the one will be shifted to the cell corresponding to electrode 34B. This is continued until the whole image is scanned.

If the addressing circuitry is desired to be off-chip, the electrodes could be configured as in FIG. 3B. The addressing structure could then be handled externally. The reference to off-chip is meant strictly as relating to the membrane. It is possible that the membrane would not take up the whole chip, and the addressing circuitry could be off to one side or the other.

As discussed previously, the shape of the mirror for the long, linear, deflected area on a membrane DMD might be rectangular. In FIG. 3C a different embodiment may be to have an array of individual membranes on top of the electrodes. Electrode 34A is shown as the long, dashed-line rectangle. Above that, defined by the solid lines, are pixels 38A, 38B, etc. The way to manufacture the large membrane DMDs is to etch holes in the membrane such that a plasma etch will remove all but the edge of the elastomer, leaving a membrane supported at the edges. To manufacture this array of small membranes, the holes are left such that the membrane is supported by elastomer in a grid which will define the small membranes. In this case, the light would be reflected side to side, as well as up and down, so the mirror 14 from FIG. 2, would probably be round.

This type of scanning optical system is low in power and more compact. With the elimination of the mechanical moving parts, it will also prove to be more reliable. If used in photocopiers, the input optical system could be configured to eliminate the scanning light bar, since the scanning is done by the membrane. The whole sheet of paper can be illuminated by a fixed light source, eliminating more moving, power-hungry parts.

Thus, although there has been described to this point a particular embodiment for a scanning optical system, it is not intended that such specific references be considered as limitations upon the scope of this invention except in-so-far as set forth in the following claims.

What is claimed is:

1. An optical system for scanning an image comprising:
    a. a spatial light modulator for receiving said image and for selectively reflecting portions of said image;
    b. a detector for detecting said portions; and
    c. optics for directing said image onto said spatial light modulator and said portions of said image from said spatial light modulator onto said detector.

2. The system in claim 1 wherein said detector is an infrared detector.

3. The system in claim 1 further comprising a print engine of a copier wherein said detector is an input to said print engine.

4. An optical system for scanning an image comprising:
    a detector for detecting light;
    at least one lens for focusing light from an image source;
    a spatial light modulator array receiving said focused light, said spatial light modulator array comprised of an array of spatial light modulator cells, each of said cells selectively addressable for deflecting incident light toward said detector, wherein said cells are serially addressed thereby serially deflecting portions of said focused light onto said detector.

5. The system of claim 4 wherein said spatial light modulator array is comprised of at least two rows of spatial light modulator cells, each said rows comprised of at least two spatial light modulator cells.

6. The system of claim 4 wherein said spatial light modulator array is comprised of at least two rows of spatial light modulator cells, each said row comprised of at least one spatial light modulator cell, wherein all said cells on a row are addressed simultaneously.

7. The system of claim 4 wherein said spatial light modulator array is comprised of at least two rows of spatial light modulator cells, each said row comprised of at least one spatial light modulator cell, wherein all said cells on a row are addressed simultaneously and each row is addressed sequentially.

8. The system of claim 4 wherein said image source is self-radiating.

9. The system of claim 4 wherein said image source is illuminated by a light source.

10. The system of claim 4 wherein said detector is an infrared detector.

11. The system of claim 4 further comprising a print engine connected to said detector for reproducing said image.

12. The system of claim 4 further comprising an optical stop wherein light reflecting off an undetected cell of said spatial light modulator array is prevented from passing to said detector by said optical stop.

13. The system of claim 12 wherein said optical stop is a mirror.

14. A method of scanning an image comprising:
    providing light from an image source;
    focusing said light from an image source onto a spatial light modulator wherein said spatial light modulator comprises an array of spatial light modulator cells;
    deflecting a portion of said spatial light modulator cells to deflect a portion of said focused light;

detecting said deflected portion of said focused light; and repeating said deflecting and detecting steps until the image has been detected.

15. The method of claim 14 wherein said deflecting step comprises deflecting one row of said spatial light modulator.

16. The method of claim 14 wherein said light from an image source is infrared.

17. An optical system for scanning an input image comprising:

a. a lens for focusing light from an image source along a first light path;

b. a spatial light modulator on said first light path for receiving said focused light and selectively reflecting portions of said focused light, wherein said selectively reflected portions of said focused light are transmitted along a second light path; and c. a detector on said second light path for receiving said selectively reflected portions of said focused light.

18. The optical system of claim 17 further comprising a stop minor on said first light path for reflecting said light from said image source toward said spatial light modulator.

19. The optical system of claim 18 wherein said spatial light modulator selectively reflects portions of said focused light around said stop mirror.

20. The optical system of claim 17 wherein said spatial light modulator is a membrane deformable mirror device.

* * * * *